United States Statutory Invention Registration [19]

[11] Reg. Number: H866

Faccini et al. [43] Published: Jan. 1, 1991

[54] SHAPED CHARGE ASSEMBLY

[75] Inventors: Ernest C. Faccini, Socorro, Minn.; Felipe A. Garcia, Panama City, Fla.

[73] Assignee: The United States of America as represented by the Secretary of the Navy, Washington, D.C.

[21] Appl. No.: 901,062

[22] Filed: Jul. 17, 1986

[51] Int. Cl.[5] ..... C06B 5/02

[52] U.S. Cl. ..... 102/307; 102/496

[58] Field of Search ..... 102/306–310, 102/476

*Primary Examiner*—Peter A. Nelson

*Attorney, Agent, or Firm*—R. F. Beers; T. E. McDonnell; E. E. Goshorn

[57] ABSTRACT

Improved shaped charge assembly of relative lightweight and sealable construction and composed of nonmetallic and nonmagnetic materials that can be used for selectively destroying or disarming a variety of targets. The assembly is generally made up of casing means of tubular-like configuration, jet-forming linear means of conical shape and shaped charge body means. The liner means is interposed between the ends of the casing means where the charge body means is interposed between the casing means and the liner means at one end of the casing means. Depending upon the manner in which the assembly is to be used, at least the one end of the casing means is capped. Suitable plastic materials for use in the liner means have been found to be either polyethylene or polypropylene, having an ultra-high molecular weight. Optimum geometric parameters have been found in the use of these plastic materials for limiting the size and angular configuration of the liner means, the depth of the charge body means above the liner means, and the length of the casing means between the liner means and its other end, all for the purpose of assuring that the assembly causes the formation of an efficient jet for penetrating a target. Whenever it is required to boost the explosive effect of the shaped charge assembly, a sleeve of suitable plastic explosive material can be disposed about the one end of the casing means. Since the liner means has a density which is very similar to that of the charge body means, the assembly can form a jet having a front-tip velocity of at least 6,000 meters per second (6 km/s).

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHAPED CHARGE ASSEMBLY

This invention concerns a shaped charge assembly, and more particularly, it concerns an improved shaped charge assembly that is composed of nonmetallic and nonmagnetic materials for forming a relatively high-speed jet for penetrating a target.

BACKGROUND OF THE INVENTION

Various types of shaped charge assemblies have been designed in the past for various types of environment in relation to a target to be destroyed or otherwise disarmed. U.S. Pat. No. 4,259,906 to Krauch Jr. et al. concerns a self-propelled projectile for dispersing a toxic agent upon impacting a target. The projectile is generally made up of an aluminum casing having a dome shaped nose, a shaped charge and a toxic agent. The charge is enclosed in the trailing portion of the casing while the agent is confined in a hollow cap at the forward end of the charge. When the launched projectile impacts a target, the charge is ignited for penetrating the target and dispersing the agent therewithin. U.S. Pat. No. 4,374,495 to Thomanek relates to antitank missile having one or more shaped charges selectively arranged therein in off-axis relationship to the missile axis. The shaped charge is provided with a particular shape for a desired explosive mass content as well as a particular geometric configuration of the mass. Further, the conical liner is either arranged concentric with the charge axis or offset therefrom. By reason of the particular configuration of the shaped charge or the particular arrangement of the liner, the shaped charge can be tailored to efficiently penetrate a target as the missile flies past a target. U.S. Pat. No. 4,387,773 to McPhee discloses a shaped charge assembly for use in selectively enlarging a well bore. The assembly is suspended from a cable-supported member that is selectively lowered into a well. The assembly is generally made up of a metal casing having a conical-shaped cavity for enabling the formation of a conical-shaped charge. Such a shaped charge provides effective collapse of the copper liner as well as efficient formation of a jet embodying the atomized liner for effectively penetrating underground strata to release a crude oil deposit. U.S. Pat. No. 4,474,113 to Kyro et al. relates to a shaped charge assembly having a generally conically-shaped copper liner of curvilinear extent in longitudinal cross section. The casing of the assembly is of conical shape for enabling the impact angle of the detonation wave front to be substantially constant when the shaped charge is ignited. By reason of the particular shape of the liner and casing, an efficient jet is formed for penetrating a target located a predetermined distance from the assembly. U.S. Pat. No. 4,481,886 to Brattstrom et al. concerns a launched vehicle having a shaped-charge assembly. The assembly is generally made up of a trumpet-shaped copper liner, an outer steel casing of interconnected concentric cylindrical and frusto-conical sections, and a hollow-shaped charge interposed between the casing and the liner. The assembly is disposed in the vehicle in off-axis relation thereto. By reason of the particular shape of the liner, casing and charge, an efficient jet is formed for penetrating a target when the charge is ignited as the vehicle flies past the target. However, none of the aforediscussed references, whether taken alone or in any combination, remotely suggest an improved shaped charge assembly being made up of, among other things, a suitable grade of plastic materials having nonmetallic and nonmagnetic characteristics whereby the assembly can be selectively positioned in relation to a target without detection of the assembly and detonation of the target. Moreover, by reason of the assembly being constructed of plastic materials its components can readily be constructed with optimal geometric relationships. Also, the liner in being of plastic material usually has a density that is much nearer the density of the explosive than that of the metallic shaped charge. Hence, the liner advantageously contributes to the formation of a jet having a front-tip velocity of at least six thousand meters per second for penetrating an explosive target, such as for the purpose of disarming same.

SUMMARY OF THE INVENTION

An object of the invention is to provide an improved shaped-charge assembly of relatively lightweight and simple construction that can be easily fabricated from readily-available supplies by ordinary manufacturing techniques.

Another object of the invention is to provide an improved shaped-charge assembly that is made up of plastic materials and that can be selectively positioned in relation to an explodable target without detection of the assembly itself.

Still another object is to provide an improved shaped-charge assembly that can be readily designed to meet the requirements of its intended use including a sealed, closed construction for underwater use.

In summary, the improved relatively lightweight shaped-charge assembly of the invention for disarming a target is generally made up of components of a suitable grade of plastic material, e.g., polyethylene or polypropylene, each having ultrahigh molecular weight characteristics. These plastic components are an outer casing or sleeve; a cone-shaped, jet-forming liner; a top cap and a bottom cap if a shaped-charge assembly of sealed construction is required.

The casing between its ends is provided with inner and outer concentric counterbores. The inner counterbore is of shorter length. A shoulder at the inner end of the inner counterbore mounts the annular base of the liner and enables the liner to be affixed to the sleeve interior in concentric and aligned relation to the assembly axis.

A suitable solid-type explosive, such as Octol, is deposited in the casing between the liner and the outer end of the sleeve. In order to assure proper formation of a jet by the liner, the height of the casing above the apex of the liner should be about one and three-fourths the outer diameter of the liner. At the same time, the liner should have an apex angle of about sixty degrees (60°). A top cap of inverted shallow-cup shaped configuration is suitably affixed to the outer end of the casing so as to close off same and cover the outer end of the casing. The top cap is provided with a concentric central opening for receiving a detonator for igniting the explosive. It has been found that the optimum thickness/diameter ratio for the liner should be such that the ratio is no less than 12% and no greater than 58%. In other words, the thickness of liner should have a range of about one-tenth to about six-tenths (1/10th to 6/10ths) of the liner diameter. At the same time, the height of the casing between the shoulder and the lower end of the sleeve should be about five to six times the liner diameter so as to assure efficient formation of a jet prior to impacting a target.

Depending on the jet velocity requirements of the assembly for penetrating and disarming a target, a booster explosive can be affixed to the casing exterior. To this end a flexible sleeve of inverted cup-shaped configuration and composed of suitable plastic explosive is disposed about the outer end of the casing and the top cap thereof. The sleeve explosive should have the characteristic of generating a detonation wavefront velocity that is either greater than or equal to the wavefront velocity generated by the solid explosive within the casing. In using the booster sleeve, it has been found that the front-tip velocity of the jet increases from about six thousand meters per second (6,000 m/s) to about ten thousand meters per second (10,000 m/s).

If the assembly is attached to an underwater target the lower end of the casing is sealed and closed off by a suitably attached bottom cap of similar cup-shaped configuration as the top cap. Moreover, the inner portion of the bottom cap is of reduced thickness so as to facilitate fracture when impacted by the jet without adversely affecting the jet penetrating characteristics.

DETAILED DESCRIPTION OF THE INVENTION

Figure 1:
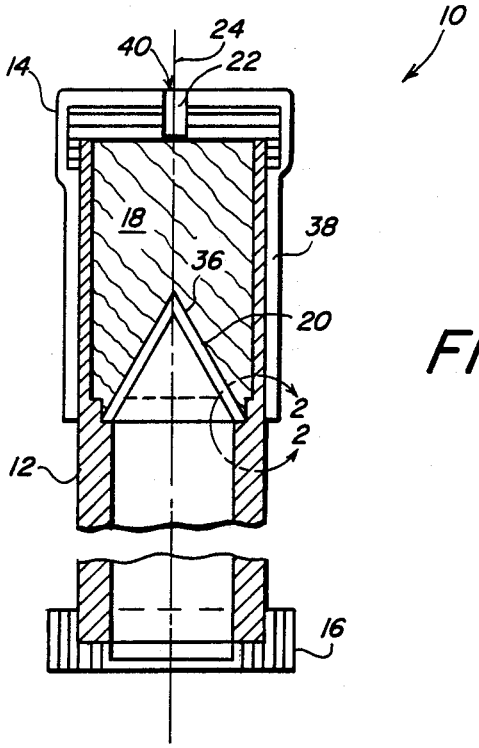
FIG. 1 is a cross-sectional fragmented view of an embodiment of a shaped-charge assembly of the invention.

With further reference to FIG. 1, an improved shaped charge assembly 10 of relatively lightweight construction is made up of nonmetallic and nonmagnetic materials. Moreover, the assembly is generally comprised of a casing 12 of tubular shape, a top cap 14 of inverted cup-shaped configuration, a bottom cap 16 of cup-shaped configuration, a filler explosive 18, and a jet-forming liner 20 of conical shape. Casing 12, both caps 14 and 16, and liner 20 are preferably made up of a suitable plastic material of ultra-high, molecular weight such as polyethylene or polypropylene. A suitable filler explosive material for use with assembly 10 has been found to be a commercially available explosive known as "OCTOL" where the burn rate of the explosive is on the order of from 22,000 feet per second to 27,000 feet per second. The exterior of cap 14 is provided with a closed end opening 22 that is aligned with assembly axis 24 for receiving an appropriate detonation device (not shown). A suitable adhesive is used for fixing caps 14 and 16 to their associated end of casing 12. Cap 16 is normally not required for assembly 10 unless it is used in marine-type applications when a fully enclosed and sealed assembly 10 is required to assure proper operation thereof.

Figure 2:
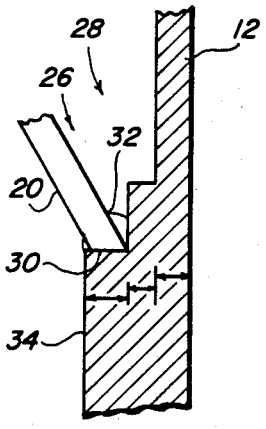
FIG. 2 is an enlarged sectional view with parts removed as taken within the bounds of encompassing line 2—2 of FIG. 1, and illustrates further details of the invention.

Casing 12 is provided with inner and outer concentric counterbores 26 and 28 at the upper end thereof. The inner end of inner counterbore 26 is defined by a shoulder 30 extending between the intermediate interior surface 32 of casing 12 and the innermost interior surface 34 thereof. The outer diameter of liner 20 is substantially equal to the diameter of surface 32. The overall depth of counterbores 26 and 28 between the outer end of casing 12 and shoulder 30 is such that the depth of explosive 18 between apex end 36 of liner 20 and the upper end of casing 12 is on the order of about one and three-fourths ($1\frac{3}{4}$) times the outer diameter of liner 20. One of the reasons for this depth of explosive above apex 36 of liner 20 is to assure the formation of a jet profile by liner 20 having a front-tip velocity of at least 6,000 meters per second when explosive 18 is detonated. Shoulder 30 has a radial extent at least about one and one-half ($1\frac{1}{2}$) times the thickness of liner 20. One of the reasons for such a radial extent of shoulder 30 is to assure a positive seating area for the bottom annular edge of liner 20. At the same time the radial extent of shoulder 30 provides sufficient bonding surface area so as to enable adhesive assembly of liner 20 to shoulder 30 when liner 20 is connected to casing 12 in concentric relation to axis 24 as shown in FIGS. 1-2. One of the reasons for outer counterbore is to provide clearance and access in facilitating assembly of liner 20 to shoulder 30. Also, it has been found that the depth of inner counterbore 26 should be about twice the thickness of liner 20 so as to positively retain liner 20 in concentric relation to axis 24.

Depending upon the requirements of a charge assembly in penetrating a target, a booster may sometimes be required. To this end, an inverted cup-shaped sleeve 38 that is composed of a suitable grade of solid explosive material is disposed about the upper end of casing 12. An inner portion at the flat bottom end of sleeve 38 is provided with an opening 40 for insertion of a detonation device (not shown) in cap opening 22. The characteristics of the solid explosive material of sleeve 38 should be such that the velocity of its detonation wave front is either greater than or equal to the velocity of the detonation wave front of explosive 18 so as to assure optimum results when booster sleeve 38 is used. With booster sleeve 38, the fronttip velocity of a jet profile has been on the order of ten thousand meters per second (10K m/sec). It has been found that sleeve explosive 38 should have a density of about eight-tenths of a gram per cubic centimeter (8/10 gm/cc) to about one and a half grams per cubic centimeter (1.5 gms/cc), liner 20 of about 0.9 to 0.97 gm/cc, and explosive 18 of about 1.3 to 1.9 gms/cc.

For optimum results of assembly 10, casing 12 should have a standoff height of about five to six times the outer diameter of liner 20 where the standoff height extends from shoulder 30 and the lower end of casing 12. In the design of liner 20, optimum parameters have been found to be a liner thickness of about twelve to fifty-eight percent (12.0 to 58.0%) of the liner outer diameter. In other words, the thickness of liner 20 should be no less than about twelve percent of the liner outer diameter and no greater than about fifty-eight percent of the liner outer diameter so as to assure proper formation of a jet profile in conjunction with the particular chemical composition of explosive material 18 and of sleeve 38 (if used) during use of assembly 10. At the same time the apex angle should be no greater than about sixty degrees (60°) By reason of the simple design of assembly 10, it can readily be made up from bored-out tubing for casing 12, injection molding to form liner 20 and both caps 14 and 16, and vacuum-cast or press-filled explosive 18. As the result of explosive 18 being cast or press-filled, an homogenous mass is provided so as to substantially fill all voids between liner 20 and the upper end of casing 12. Moreover, the thickness of casing 12 between the outer surface and outer counterbore 28 should be at least equal to the thickness of liner 20. Similarly, the radial extent between inner and outer counterbores 26 and 28 should also be at least equal to the thickness of liner 20.

Figure 3:
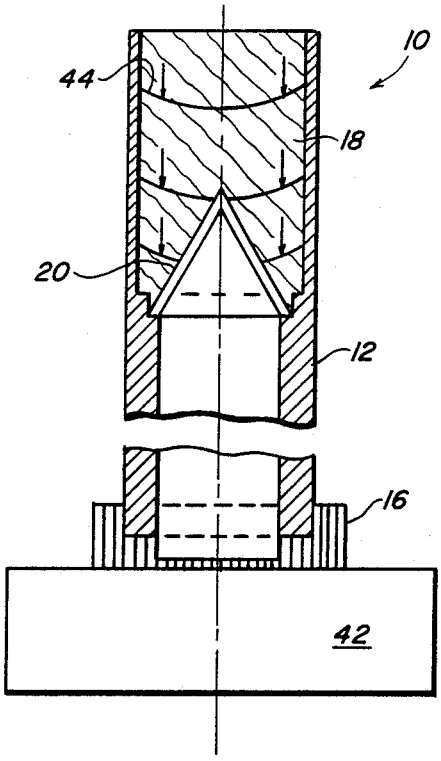
FIG. 3 is a sectional view similar to FIG. 1 with parts added and other parts removed, and illustrates a detonation operative mode of the assembly for impacting a target.
Figure 4:
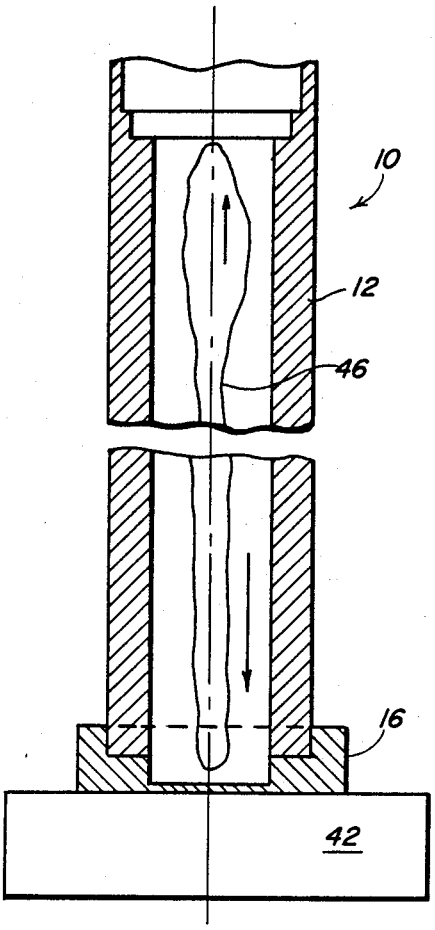
FIG. 4 is another sectional view similar to FIG. 3 with parts added and other parts removed, and illustrates another operative mode of the assembly just prior to impacting a target.

As illustrated in FIG. 3, assembly 10 is appropriately mounted on a target 42 to be penetrated and disarmed. By reason of assembly being composed of nonmagnetic and nonmetallic materials the assembly is, for all practicable purposes, not detectable. Upon detonation of explosive charge 20 detonation wave front 44 progressively advances toward liner 20 so as to progressively collapse liner and ultimately form a velocity jet profile 46 as illustrated in FIG. 4. By reason of liner 20 being of suitable plastic material with its density being very similar to that of explosive material 18, efficient energy transfer is effected between explosive 18 and liner 20 when the explosive is detonated. Since jet profile 44, as formed by the improved assembly of nonmagnetic and nonmetallic materials as aforedescribed, has a density normally no more than the density of the explosive (not shown) of target 42, it readily penetrates the target without detonation thereof so as to disarm same.

Obviously, many modifications and variations of the present invention are possible in light of the above teachings. It is therefore to be understood that, within the scope of the appended claims, the invention may be practised otherwise than as specifically described.

What is claimed is:

1. A relatively lightweight shaped-charge assembly constructed of nonmetallic and nonmagnetic materials, said assembly comprising:

charge body means of explosive material, said charge body means being of preselected density and of substantially homogenous uninterrupted mass throughout its profile, the inner end of the charge body means having a hollow interior of conical shape, outer tubular-like, elongated casing means of a suitable plastic material, the interior of the casing means at one end thereof being counterbored so as to form at least one counterbore, the depth of the counterbore substantially corresponding to the depth of the charge body means in order that the casing means at the one end surrounds and encloses the charge body means, shoulder means extending between the counterbore and the interior of the casing means at the inner end of the counterbore, the other end of the casing means extending from the shoulder means and being of such an extent so as to assure formation of an effective jet profile between the ends of the casing means prior to the forward end of the jet impacting a target upon detonation of the charge body means during use of the assembly;

inner jet-forming liner means of cone-shaped configuration, said liner means being constructed of a suitable plastic material, and being mounted on the shoulder means for enclosing and covering the charge body means at the inner end thereof; and cap means of a suitable plastic material mounted on and connected to the one end of the casing means for enclosing the charge body means, said cap means including means for receiving detonator means for detonating the charge body means so as to form an elongated jet profile between the ends of the casing means within the interior thereof, wherein the jet profile has a front-tip velocity On the order of at least 6,000 meters per second.

2. An assembly as set forth in claim 1 wherein said casing means, liner means and cap means are composed of a suitable grade of polyethylene or polypropylene material having the characteristic of ultra-high, molecular weight.

3. An assembly as set forth in claim 1 wherein said casing means, liner means and said cap means are concentrically disposed about the longitudinal axis of the assembly.

4. An assembly as set forth in claim 1 wherein the other end of said casing means is closed off by another cap means prior to use of said assembly.

5. An assembly as set forth in claim 1 wherein both of said cap means are sealably connected to said casing means.

6. An assembly as set forth in claim 1 wherein the counterbore is made up of inner and outer concentric counterbores; the outer counterbore having a greater depth than the inner counterbore; and the inner end of the inner counterbore terminating at the shoulder means.

7. An assembly as set forth in claim 1 wherein the liner means has an apex angle on the order of sixty degrees (60°).

8. An assembly as set forth in claim 7 wherein the thickness of the liner means is on the order of at least twelve percent (12%) of the outer diameter of the liner means to no more than fifty-eight percent (58%) of the liner means diameter.

9. An assembly as set forth in claim 1 wherein the length of the casing means between the shoulder means and the outer end thereof is usually on the order of five to six (5 to 6) times greater than the outer diameter of the liner means.

10. An assembly as set forth in claim 1 wherein the height of the charge body means disposed above the liner means is on the order of one and three-fourths (1.74) times the outer diameter of the liner means.

11. An assembly as set forth in claim 1 wherein the density of the liner means is of the same order as the density of the charge body means.

12. An assembly as set forth in claim 1 wherein the casing means includes sleeve means disposed thereabout at the one end thereof, the sleeve means being composed of a suitable grade of explosive material in order to serve as booster means for the charge body means during assembly use.

13. An assembly as set forth in claim 4 wherein the other cap means includes a relatively thin and destructible inner portion.

* * * * *